(12) United States Patent
Kim et al.

(10) Patent No.: US 8,406,605 B2
(45) Date of Patent: *Mar. 26, 2013

(54) METHOD FOR RECORDING AND MANAGING A MULTI-CHANNEL STREAM

(75) Inventors: Mi Hyun Kim, Seoul (KR); Sang Ryun Cho, Seoul (KR); Byung Jin Kim, Kyunggi-do (KR); Kang Soo Seo, Kyunggi-do (KR); Sung Wan Park, Suwon-si (KR)

(73) Assignee: LG Electronics Inc., Seoul (KR)

( * ) Notice: Subject to any disclaimer, the term of this patent is extended or adjusted under 35 U.S.C. 154(b) by 918 days.

This patent is subject to a terminal disclaimer.

(21) Appl. No.: 12/476,176

(22) Filed: Jun. 1, 2009

(65) Prior Publication Data

US 2009/0297127 A1   Dec. 3, 2009

Related U.S. Application Data

(63) Continuation of application No. 10/424,788, filed on Apr. 29, 2003, now Pat. No. 7,561,778.

(30) Foreign Application Priority Data

May 7, 2002   (KR) .................... 02-25140

(51) Int. Cl.
H04N 9/80 (2006.01)
H04N 5/92 (2006.01)

(52) U.S. Cl. ........................ 386/248; 386/326
(58) Field of Classification Search .................. 386/248, 386/241, 326–341
See application file for complete search history.

(56) References Cited

U.S. PATENT DOCUMENTS

| | | | |
|---|---|---|---|
| 5,521,898 A | 5/1996 | Ogasawara |
| 5,583,652 A | 12/1996 | Ware |
| 5,602,956 A | 2/1997 | Suzuki et al. |
| 5,630,006 A | 5/1997 | Hirayama et al. |
| 5,633,839 A | 5/1997 | Alexander et al. |
| 5,691,972 A | 11/1997 | Tsuga et al. |
| 5,703,997 A | 12/1997 | Kitamura et al. |
| 5,734,788 A | 3/1998 | Nonomura et al. |
| 5,742,569 A | 4/1998 | Yamamoto et al. |
| 5,784,528 A | 7/1998 | Yamane et al. |
| 5,881,203 A | 3/1999 | Fujinami et al. |
| 5,884,004 A | 3/1999 | Sato et al. |
| 5,913,010 A | 6/1999 | Kaneshige et al. |
| 5,917,781 A | 6/1999 | Kim |
| 5,923,869 A | 7/1999 | Kashiwagi et al. |
| 5,933,410 A | 8/1999 | Nakane et al. |
| 5,953,290 A | 9/1999 | Fukuda et al. |
| 5,999,694 A | 12/1999 | Yasuda et al. |
| 5,999,698 A | 12/1999 | Nakai et al. |

(Continued)

FOREIGN PATENT DOCUMENTS

| | | |
|---|---|---|
| CN | 1163673 A | 10/1997 |
| CN | 1205793 A | 1/1999 |

(Continued)

*Primary Examiner* — Thai Tran
*Assistant Examiner* — Nigar Chowdhury
(74) *Attorney, Agent, or Firm* — Birch, Stewart, Kolasch & Birch, LLP (57) ABSTRACT

The present invention relates to a method for recording and managing a multi-channel broadcast stream. The present method records on a recording medium such as a BD-RW a multi-channel broadcast stream where a plurality of channels are multiplexed, and creates and records management information for individual search and reproduction control of the plural channels. Consequently, this method ensures fast random access and various trick play of individual subchannel streams multiplexed in a recorded multi-channel stream at user's request.

27 Claims, 5 Drawing Sheets

U.S. PATENT DOCUMENTS

| | | | |
|---|---|---|---|
| 6,009,234 A | 12/1999 | Taira et al. |
| 6,014,495 A | 1/2000 | Moriyama et al. |
| 6,064,385 A | 5/2000 | Sturgeon et al. |
| 6,064,796 A | 5/2000 | Nakamura et al. |
| 6,067,400 A | 5/2000 | Saeki et al. |
| 6,078,727 A | 6/2000 | Saeki et al. |
| 6,084,581 A | 7/2000 | Hunt |
| 6,097,676 A | 8/2000 | Fujinami et al. |
| 6,118,927 A | 9/2000 | Kikuchi et al. |
| 6,130,869 A | 10/2000 | Tokoro et al. |
| 6,167,189 A | 12/2000 | Taira et al. |
| 6,215,746 B1 | 4/2001 | Ando et al. |
| 6,219,488 B1 | 4/2001 | Mori et al. |
| 6,222,805 B1 | 4/2001 | Mori et al. |
| 6,247,022 B1 | 6/2001 | Yankowski |
| 6,285,825 B1 | 9/2001 | Miwa et al. |
| 6,292,226 B1 | 9/2001 | Yamanaka et al. |
| 6,308,005 B1 | 10/2001 | Ando et al. |
| 6,321,027 B2 | 11/2001 | Honjo et al. |
| 6,336,002 B1 | 1/2002 | Yamauchi et al. |
| 6,356,971 B1 | 3/2002 | Katz et al. |
| 6,360,055 B1 | 3/2002 | Kaneshige et al. |
| 6,373,803 B2 | 4/2002 | Ando et al. |
| 6,377,474 B1 | 4/2002 | Archambeault et al. |
| 6,377,518 B1 | 4/2002 | Auwens et al. |
| 6,377,747 B1 | 4/2002 | Murase et al. |
| 6,381,404 B1 | 4/2002 | deCarmo |
| 6,385,388 B1 | 5/2002 | Lewis et al. |
| 6,392,969 B1 | 5/2002 | Heo et al. |
| 6,393,430 B1 | 5/2002 | Van Ryzin |
| 6,415,101 B1 | 7/2002 | deCarmo et al. |
| 6,424,793 B1 | 7/2002 | Setogawa et al. |
| 6,424,797 B1 | 7/2002 | Murase et al. |
| 6,429,364 B1 | 8/2002 | Muraki et al. |
| 6,532,334 B1 | 3/2003 | Kikuchi et al. |
| 6,570,837 B1 | 5/2003 | Kikuchi et al. |
| 6,580,870 B1 | 6/2003 | Kanazawa et al. |
| 6,584,277 B2 | 6/2003 | Tsumagari et al. |
| 6,615,192 B1 | 9/2003 | Tagawa et al. |
| 6,647,496 B1 | 11/2003 | Tagawa et al. |
| 6,700,839 B1 | 3/2004 | Auflick et al. |
| 6,727,421 B2 | 4/2004 | Izawa et al. |
| 6,763,345 B1 | 7/2004 | Hempleman et al. |
| 6,766,103 B2 | 7/2004 | Kim et al. |
| 6,782,192 B1 | 8/2004 | Tanaka et al. |
| 6,795,499 B1 | 9/2004 | Kato et al. |
| 6,798,981 B1 | 9/2004 | Yamauchi et al. |
| 6,832,293 B1 | 12/2004 | Tagawa et al. |
| 6,859,421 B2 | 2/2005 | Sawabe et al. |
| 6,904,227 B1 | 6/2005 | Yamamoto et al. |
| 6,912,218 B1 | 6/2005 | Jeon et al. |
| 6,914,863 B2 | 7/2005 | Ono |
| 6,965,727 B1 | 11/2005 | Sawabe et al. |
| 6,999,674 B1 | 2/2006 | Hamada et al. |
| 7,006,758 B1 | 2/2006 | Yamamoto et al. |
| 7,050,384 B2 | 5/2006 | Sasaki et al. |
| 7,065,287 B1 | 6/2006 | Heredia et al. |
| 7,113,694 B2 | 9/2006 | Kim et al. |
| 7,236,687 B2 | 6/2007 | Kato et al. |
| 7,477,833 B2 | 1/2009 | Kato et al. |
| 2001/0014070 A1 | 8/2001 | Ando et al. |
| 2001/0026679 A1 | 10/2001 | Koshino et al. |
| 2001/0030710 A1 | 10/2001 | Werner |
| 2001/0036358 A1 | 11/2001 | Kim et al. |
| 2001/0043790 A1 | 11/2001 | Saeki et al. |
| 2001/0053280 A1 | 12/2001 | Yamauchi et al. |
| 2002/0018416 A1 | 2/2002 | Heo |
| 2002/0041557 A1 | 4/2002 | Heo |
| 2002/0046328 A1 | 4/2002 | Okada |
| 2002/0093556 A1 | 7/2002 | Ishizawa et al. |
| 2002/0093886 A1 | 7/2002 | Ijichi et al. |
| 2002/0106196 A1 | 8/2002 | Yamauchi et al. |
| 2002/0126994 A1 | 9/2002 | Gunji et al. |
| 2002/0129036 A1 | 9/2002 | Ho Yuen Lok et al. |
| 2002/0135608 A1 | 9/2002 | Hamada et al. |
| 2002/0145702 A1* | 10/2002 | Kato et al. ........................ 352/1 |
| 2002/0159368 A1 | 10/2002 | Noda et al. |
| 2002/0177914 A1 | 11/2002 | Chase |
| 2002/0180803 A1 | 12/2002 | Kaplan et al. |
| 2002/0191963 A1 | 12/2002 | Kikuchi et al. |
| 2003/0035681 A1 | 2/2003 | Ho |
| 2003/0058948 A1 | 3/2003 | Kelly et al. |
| 2003/0103604 A1 | 6/2003 | Kato et al. |
| 2003/0118327 A1 | 6/2003 | Um et al. |
| 2003/0123346 A1 | 7/2003 | Ishii et al. |
| 2003/0123845 A1 | 7/2003 | Koda et al. |
| 2003/0147322 A1 | 8/2003 | Ono |
| 2003/0161615 A1 | 8/2003 | Tsumagari et al. |
| 2003/0235404 A1 | 12/2003 | Seo et al. |
| 2004/0014136 A1 | 1/2004 | Ishii et al. |
| 2004/0019396 A1 | 1/2004 | McMahon et al. |
| 2004/0047588 A1 | 3/2004 | Okada et al. |
| 2004/0047591 A1 | 3/2004 | Seo et al. |
| 2004/0076402 A1 | 4/2004 | Jung et al. |
| 2004/0114908 A1 | 6/2004 | Ito |
| 2004/0156621 A1 | 8/2004 | Seo et al. |
| 2004/0208135 A1 | 10/2004 | Nakamura et al. |
| 2004/0213105 A1 | 10/2004 | Seo et al. |
| 2004/0220791 A1 | 11/2004 | Lamkin et al. |
| 2005/0019007 A1 | 1/2005 | Kato et al. |
| 2005/0025459 A1 | 2/2005 | Kato et al. |
| 2005/0036763 A1 | 2/2005 | Kato et al. |
| 2006/0013564 A1 | 1/2006 | Hamada et al. |
| 2006/0110132 A1 | 5/2006 | Takakuwa et al. |
| 2006/0222340 A1 | 10/2006 | Yamauchi et al. |

FOREIGN PATENT DOCUMENTS

| | | |
|---|---|---|
| CN | 1212427 A | 3/1999 |
| CN | 1220458 A | 6/1999 |
| CN | 1239574 A | 12/1999 |
| CN | 1251680 A | 4/2000 |
| CN | 1263345 A | 8/2000 |
| CN | 1272209 A | 11/2000 |
| CN | 1310445 A | 8/2001 |
| CN | 1317200 A | 10/2001 |
| CN | 1320926 A | 11/2001 |
| CN | 1346491 A | 4/2002 |
| CN | 1364387 A | 8/2002 |
| CN | 1383679 A | 12/2002 |
| CN | 1393872 A | 1/2003 |
| CN | 1509572 A | 6/2004 |
| CN | 1555058 A | 12/2004 |
| CN | 1571055 A | 1/2005 |
| CN | 1606355 A | 4/2005 |
| CN | 1606356 A | 4/2005 |
| CN | 1606357 A | 4/2005 |
| CN | 1611071 A | 4/2005 |
| EP | 0 676 755 A1 | 10/1995 |
| EP | 0723216 A2 | 7/1996 |
| EP | 0724264 A2 | 7/1996 |
| EP | 0 737 980 A2 | 10/1996 |
| EP | 0737009 A2 | 10/1996 |
| EP | 0831647 A1 | 3/1998 |
| EP | 0836183 A2 | 4/1998 |
| EP | 0858073 A1 | 8/1998 |
| EP | 0872839 A2 | 10/1998 |
| EP | 0 903 738 A2 | 3/1999 |
| EP | 0949622 A2 | 10/1999 |
| EP | 1024494 A2 | 8/2000 |
| EP | 1050880 A1 | 11/2000 |
| EP | 1103974 A2 | 5/2001 |
| EP | 1126454 A1 | 8/2001 |
| EP | 1041565 B1 | 9/2001 |
| EP | 1148503 A1 | 10/2001 |
| EP | 1041569 B1 | 1/2002 |
| EP | 1198132 A1 | 4/2002 |
| EP | 1198133 A1 | 4/2002 |
| EP | 1 205 933 A2 | 5/2002 |
| EP | 1 271 526 A2 | 1/2003 |
| EP | 1280348 A1 | 1/2003 |
| EP | 1398965 A1 | 3/2004 |
| EP | 1469677 A1 | 10/2004 |
| EP | 1391119 B1 | 6/2006 |
| ER | 0836189 A1 | 4/1998 |
| JP | 3199243 A | 8/1991 |
| JP | 3199711 A | 8/1991 |
| JP | 8-273304 A | 10/1996 |

| | | | | | | |
|---|---|---|---|---|---|---|
| JP | 09-135421 | A | 5/1997 | KR | 1996-0038744 A | 11/1996 |
| JP | 10-032780 | A | 2/1998 | KR | 1996-0038901 A | 11/1996 |
| JP | 10-040667 | A | 2/1998 | KR | 1996-0038905 A | 11/1996 |
| JP | 2000-195235 | A | 3/1998 | KR | 1999-0022858 A | 3/1999 |
| JP | 11-69308 | A | 3/1999 | KR | 1999-0079482 A | 11/1999 |
| JP | 11-69309 | A | 3/1999 | KR | 2000-0053633 A | 8/2000 |
| JP | 11-96653 | A | 4/1999 | KR | 2001-0022702 A | 3/2001 |
| JP | 11-120747 | A | 4/1999 | KR | 2001-0028735 A | 4/2001 |
| JP | 11-161663 | A | 6/1999 | KR | 10-0300986 B1 | 6/2001 |
| JP | 11-213522 | A | 8/1999 | KR | 2001-0051898 A | 6/2001 |
| JP | 11-213627 | A | 8/1999 | KR | 2001-0098007 A | 11/2001 |
| JP | 11-259985 | A | 9/1999 | KR | 2001-0107578 A | 12/2001 |
| JP | 11-296997 | A | 10/1999 | KR | 2002-0006273 A | 1/2002 |
| JP | 2000-021130 | A | 1/2000 | KR | 2002-0020919 A | 3/2002 |
| JP | 2000-067522 | A | 3/2000 | KR | 2002-0097454 A | 12/2002 |
| JP | 2000-149405 | A | 5/2000 | KR | 2002-0097455 A | 12/2002 |
| JP | 2000-222822 | A | 8/2000 | WO | WO-97/13366 A1 | 4/1997 |
| JP | 2000-235779 | A | 8/2000 | WO | WO-97/14151 A1 | 4/1997 |
| JP | 2000-235780 | A | 8/2000 | WO | WO-9715924 A1 | 5/1997 |
| JP | 2000-322827 | A | 11/2000 | WO | WO-97/37491 A1 | 10/1997 |
| JP | 2000-331466 | A | 11/2000 | WO | WO-9738527 A1 | 10/1997 |
| JP | 2000-348442 | A | 12/2000 | WO | WO-9739451 A1 | 10/1997 |
| JP | 2001-24985 | A | 1/2001 | WO | WO-9908281 A1 | 2/1999 |
| JP | 2001-157145 | A | 6/2001 | WO | WO-9928169 A1 | 6/1999 |
| JP | 2001-157208 | A | 6/2001 | WO | WO-99/38169 A1 | 7/1999 |
| JP | 2001-169246 | A | 6/2001 | WO | WO-00/46803 | 8/2000 |
| JP | 2001-195809 | | 7/2001 | WO | WO-0060597 A1 | 10/2000 |
| JP | 2001-332006 | | 11/2001 | WO | WO-01/35648 | 5/2001 |
| JP | 2001-359072 | A | 12/2001 | WO | WO-0152554 A1 | 7/2001 |
| JP | 2002-025231 | A | 1/2002 | WO | WO-0182604 A1 | 11/2001 |
| JP | 2002-82838 | A | 3/2002 | WO | WO-0182606 A1 | 11/2001 |
| JP | 2002-83486 | A | 3/2002 | WO | WO-0182610 A1 | 11/2001 |
| JP | 2002-112201 | A | 4/2002 | WO | WO 02/075739 A1 | 9/2002 |
| JP | 2002-150685 | A | 5/2002 | WO | WO-02080541 A1 | 10/2002 |
| JP | 2002-158972 | A | 5/2002 | WO | WO-03047261 A1 | 6/2003 |
| JP | 2002-158974 | A | 5/2002 | WO | WO-03058957 A1 | 7/2003 |
| JP | 2002-222581 | A | 8/2002 | WO | WO 2004/001748 A1 | 12/2003 |
| JP | 2002-352515 | | 12/2002 | WO | WO-2004001728 A1 | 12/2003 |
| JP | 3379961 | B2 | 12/2002 | WO | WO-2004001750 A1 | 12/2003 |
| JP | 3392838 | B2 | 1/2003 | WO | WO-2004001752 A1 | 12/2003 |
| JP | 3392849 | B2 | 1/2003 | WO | WO-2004001753 A1 | 12/2003 |
| JP | 2003-068057 | | 3/2003 | WO | WO-2004001754 A1 | 12/2003 |
| JP | 2003-199047 | A | 7/2003 | WO | WO-2004032142 A1 | 4/2004 |
| JP | 2003-520514 | A | 7/2003 | WO | WO-2004/047100 | 6/2004 |
| JP | 2004-127397 | A | 4/2004 | WO | WO-2004/088661 A1 | 10/2004 |
| JP | 2005-513936 | A | 5/2005 | WO | WO 2005/067399 A2 | 7/2005 |
| JP | 2005-251392 | | 9/2005 | | | |
| KR | 1996-0038743 | A | 11/1996 | | | |

* cited by examiner

METHOD FOR RECORDING AND MANAGING A MULTI-CHANNEL STREAM

This application is a Continuation of application Ser. No. 10/424,788, filed on Apr. 29, 2003 now U.S. Pat. No. 7,561,778, for which priority is claimed under 35 U.S.C. §120, which claims priority of Korean Patent Application No. 2002-0025140, filed on May 7, 2002, under 35 U.S.C. §119(a), the entire contents of which are hereby incorporated by reference.

BACKGROUND OF THE INVENTION

1. Field of the Invention

The present invention relates to a method for recording onto a recording medium such as a high-density rewritable optical disk a multi-channel broadcast stream in which data streams belonging to a plurality of channels are multiplexed, and for managing the recorded multi-channel stream.

2. Description of the Related Art

The standardization of a high-capacity rewritable optical disk, so called 'Blu-ray Disk Rewritable' (abbreviated 'BD-RW'), is in rapid progress so that various products related with a BD-RW will be developed and commercialized in the near future.

Figure 1:
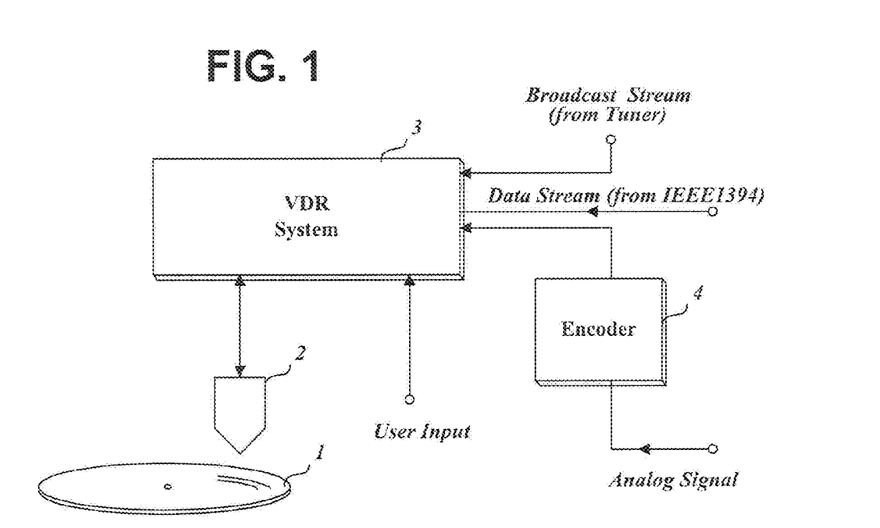
FIG. 1 is a simplified block diagram of an optical disk device such as a VDR (Video Disk Recorder)

FIG. 1 is a simplified block diagram of an optical disk device, which may be a VDR (Video Disk Recorder), capable of recording and reproducing signals to/from a recording medium such as a BD-RW.

The disk device of FIG. 1 comprises an optical pickup 2 for reading signals recorded on a recording medium 1 such as a BD-RW and for writing data stream processed from input signals; a VDR system 3 for restoring digital data by processing the read signals from the optical pickup 2 and for converting the input signals to data stream whose format is suitable for recording; and an encoder 4 for encoding analog input to deliver to the VDR system 3.

The VDR system 3 of the disk device configured as FIG. 1 records an input data stream onto the placed BD-RW 1. The input data stream may be a digital TV broadcast stream provided through a tuner or be a digital data stream provided from a personal computer (PC) through a digital interface such as IEEE1394 standard.

The digital TV broadcast stream is classified into two types, one for an open broadcast stream and the other for a private broadcast stream. The open broadcast stream, which may be major TV broadcast stream formats in many countries, means that its stream syntax has been opened. Therefore, the syntax of open broadcast stream can be analyzed by a VDR system of any disk device. The well-known ATSC DTV stream in USA, DVB stream in Europe, and ARIB IDSV stream in Japan pertain to the open broadcast stream.

On the other hand, the private broadcast stream means a broadcast stream of which syntax is difficult for a DVR system of an ordinary optical device to analyze. The private broadcast stream is generally broadcasted through a cable or a satellite.

The digital TV broadcast stream may be a broadcast stream that contains program streams of a plurality of logical channels (subchannels). For instance, the ATSC D-TV format standardized in USA can accommodate a single HD-grade program stream or plural SD-grade program streams in a single physical (RF) channel, thus, a digital TV broadcast stream in which a plurality of SD-grade program streams are multiplexed is called a multi-channel broadcast stream.

Thus, the disk device must be able to record different types of data stream, namely, an open broadcast stream, a private broadcast stream, and a multi-channel broadcast stream on a BD-RW.

When the disk device records a multi-channel broadcast stream onto a BD-RW at user's request, it is preferable to write management information for individually accessing each subchannel data stream and trick play. However, what management information to create and how to write it have not been resolved yet.

SUMMARY OF THE INVENTION

It is an object of the present invention to provide a method of creating and recording onto a rewritable recording medium management information on effective searching and trick play for individual subchannel data stream of a multi-channel broadcast stream while recording the multi-channel broadcast stream onto the recording medium.

A method of recording and managing a multi-channel broadcast stream in accordance with the present invention is characterized in that it records on a recording medium a multi-channel broadcast stream where a plurality of channels are multiplexed, and creates and records management information for individual search and reproduction control of said plural channels.

BRIEF DESCRIPTION OF THE DRAWINGS

The accompanying drawings, which are included to provide a further understanding of the invention, illustrate the preferred embodiments of the invention, and together with the description, serve to explain the principles of the present invention.

In the drawings.

DETAILED DESCRIPTION OF THE PREFERRED EMBODIMENT

In order that the invention may be fully understood, preferred embodiments thereof will now be described with reference to the accompanying drawings.

A method of recording and managing a multi-channel broadcast stream in accordance with the present invention is applicable to the disk device shown in FIG. 1. The VDR system 3 of the disk device records onto a placed BD-RW 1 a digital broadcast stream received through a tuner or a data stream received from a PC through a digital interface such as IEEE1394 standard. During the record, the VDR system 3 creates management information for searching and trick play of the recorded stream and writes the management information in matching way with the file structure of a BD-RW.

Now, a preferable embodiment of the present invention is described below in detail.

Figure 2:
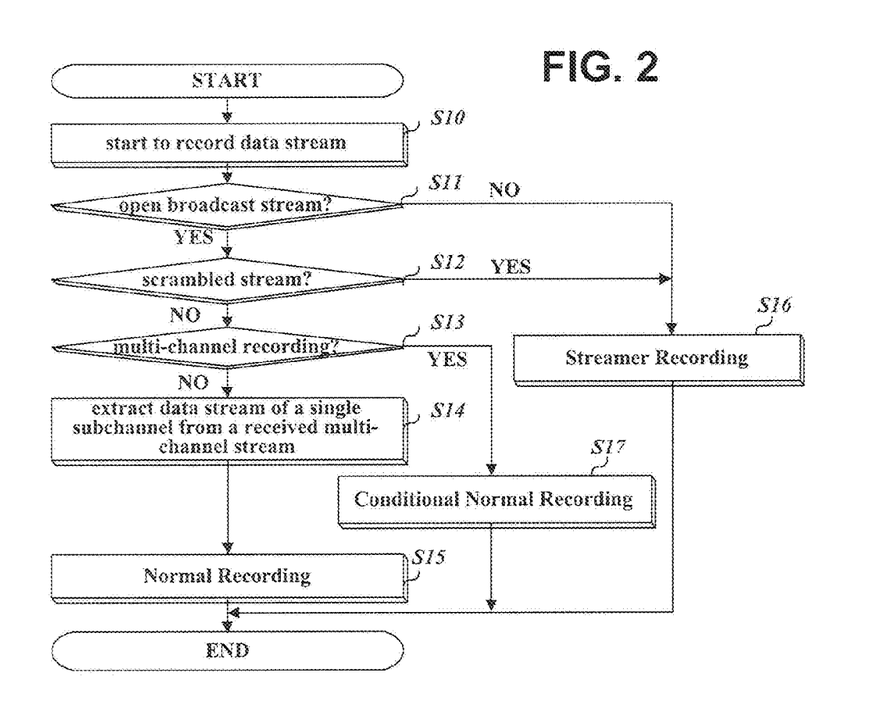
FIG. 2 shows a flow chart of a preferable embodiment of the present invention.

FIG. 2 shows a flow chart of a preferable embodiment of the present invention.

The disk device of FIG. 1 starts to record a digital broadcast stream received through a tuner as a clip file (*.m2ts) under the subdirectory 'STREAM' at user's request through key inputs (S10). At this time, the VDR system 3 checks the type of the received stream.

Figure 3:
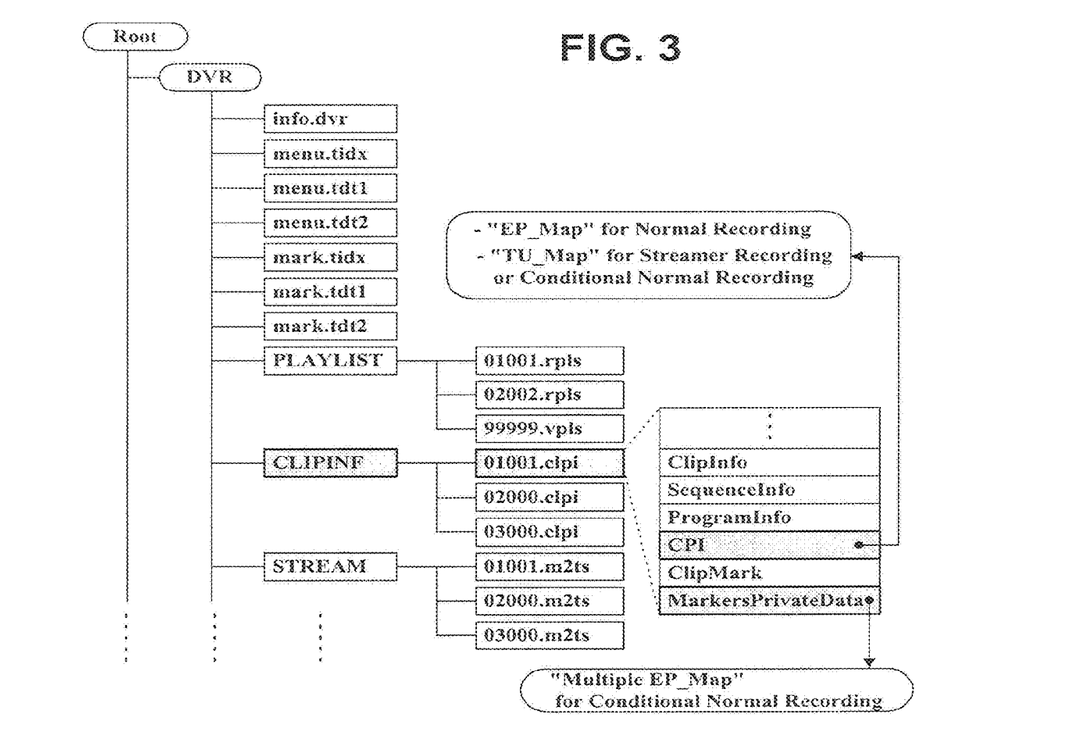
FIG. 3 shows an entry point map and a time unit map that are created under file structure of a BD-RW in accordance with a multi-channel broadcast stream recording/managing method.

If the type is not open broadcast stream but private one whose syntax can not be known, the VDR system 3 creates search information for the recorded private broadcast stream and writes the search information in a clip information file (*.clpi) under a subdirectory 'CLIPINF', as shown in FIG. 3 (S16). This recording manner for a private broadcast stream is called 'Streamer Recording' (SR).

The search information is written in CPI (Characteristic Point Information) field reserved in a clip information file and it is a map of time units that is explained later.

If the received broadcast stream is encrypted (scrambled) with an encryption key although it is open one, the VDR system 3 applies the SR manner to the received stream, that is, the VDR system 3 records the received stream as a clip file under the subdirectory 'STREAM' and writes a map of time units in CPI field of a related clip information file (S16).

If the type is open and the digital broadcast stream has not been encrypted at the same time, the VDR system 3 checks user's selection on whether multi-channel recording or not. If multi-channel recording is chosen by a user (S13), the VDR system 3 records a multi-channel stream carrying a plurality of SD-grade program streams tuned by the tuner as a clip file (*.m2ts) under the subdirectory 'STREAM' without selecting a SD-grade subchannel from a tuned physical channel.

While recording the multi-channel stream, the VDR system 3 creates a map of time units 'TU_map' for the multi-channel stream and writes the map in the CPI field of a related clip information file. At the same time, the VDR system 3 creates respective entry point (EP) maps, which are for search and trick play of individual subchannel streams, and writes the EP maps in an MPD (MakersPrivateData) area reserved in the related clip information file, as shown in FIG. 3 (S17). This recording manner that creates EP maps as well as a time unit map is called 'Conditional Normal Recording' (CNR).

In case that the type is open and the digital broadcast stream has not been encrypted at the same time, if a user selects not a multi-channel recording but a single channel or a single subchannel recording, the VDR system 3 extracts a single chosen subchannel broadcast stream from a received physical channel (S14) and records it onto the placed BD-RW 1. This recording manner is called 'Normal Recording' (NR).

In the NR mode, the extracted subchannel stream is also recorded as a clip file (*.m2ts) under the subdirectory 'STREAM' and a single EP map, management information for search and trick play, of the recorded stream is written in the CPI field in a related clip information file (*.clpi).

Figure 4:
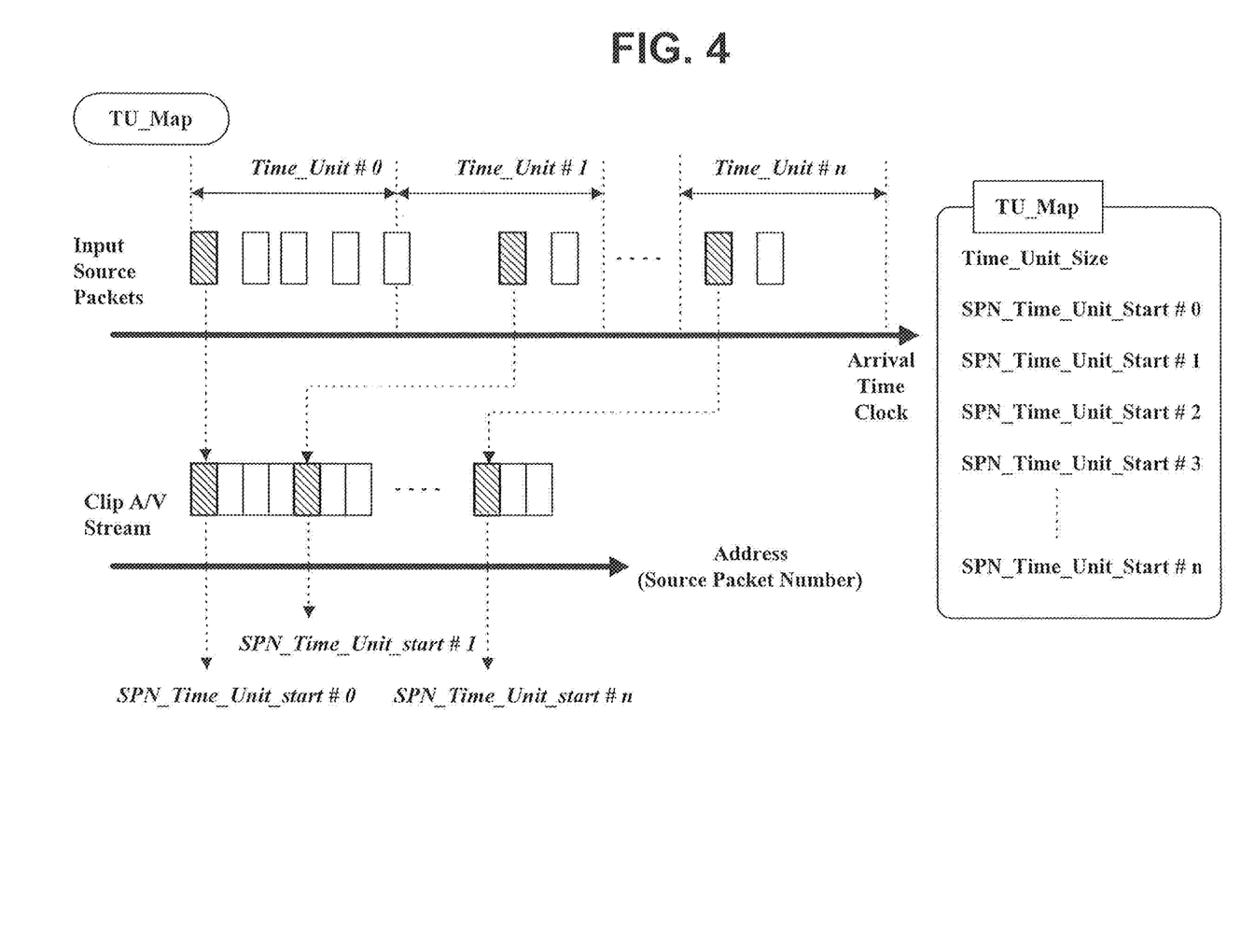
FIG. 4 illustrates a time unit map created in accordance with the present invention.

FIG. 4 illustrates a time unit map and its internal entries that are created in the SR and the CNR mode. The time unit map is composed of the size information of a time unit 'Time_Unit_Size' and start source packet numbers (SPNs) of individual time units 'SPN_Time_Unit_Start #k'. The SPN_Time_Unit_Start entries are used for rapid access of an arbitrary recording position on the recorded data stream in a clip file.

The VDR system 3 continuously counts successively-received source packets contained a private broadcast stream, a scrambled open broadcast stream, or a multi-channel data stream every time window set by the field 'Time_Unit_Size', and it writes sequentially in each SPN_Time_Unit_Start field respective sequence numbers of packets arrived first within each time window.

The time unit map is used for searching the recorded data stream. For instance, if a specific time location is entered, the entered time is divided by the value in the 'Time_Unit_Size' field, first. Then, a SPN_Time_Unit_Start entry that is indexed by a value resulting from the division is read and a source packet whose number is same with the value in the read entry is searched for in the recorded stream.

Figure 5:
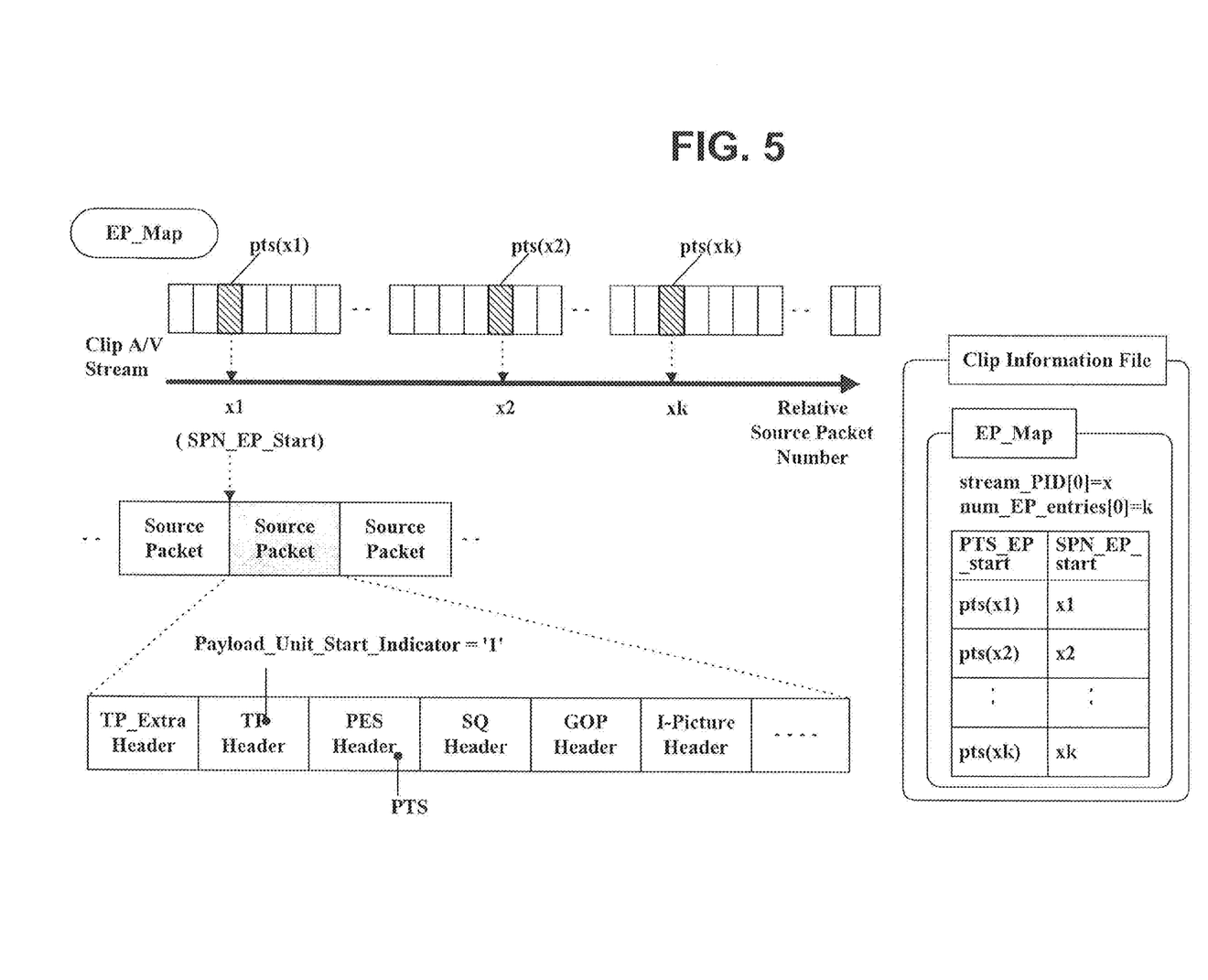
FIG. 5 illustrates an entry point map created in accordance with the present invention.

FIG. 5 illustrates an EP map and its internal entries that are created in the NR and the CNR mode. Each EP map is composed of an ID of stream packets 'stream_PID', the number of EPs 'num_EP_entries', plural pairs of PTS (Presentation Time Stamp) 'PTS_EP_start' and SPN (Source Packet Number) 'SPN_EP_start' of every source packet having video data that is random-accessible on the recorded data stream in a clip file.

For constructing an EP map or EP maps, the VDR system 3 examines individual source packets of a unencrypted open broadcast stream or a multi-channel stream to know whether or not they are I-picture starting ones that are accessible in random. An I-picture starting packet includes a payload where a GOP starts from head and has its TP header in which PUSI (Payload Unit Start Indicator) is set, so that the VDR system 3 reads PTS written in a PES header of a source packet whose PUSI is set.

And, the VDR system 3 identifies relative sequence number, namely, SPN of the source packet whose PUSI is set. The read PTS and the identified SPN of every PUSI-set source packet are written in the fields of 'PTS_EP_start' and 'SPN_EP_start', respectively. The number of pairs of the 'PTS_EP_Start' and the 'SPN_EP_Start' entry is written in the field 'num_EP_entries' and PID of source packets constituting the recorded data stream or each subchannel stream is written in the field 'stream_PID'.

Figure 6:
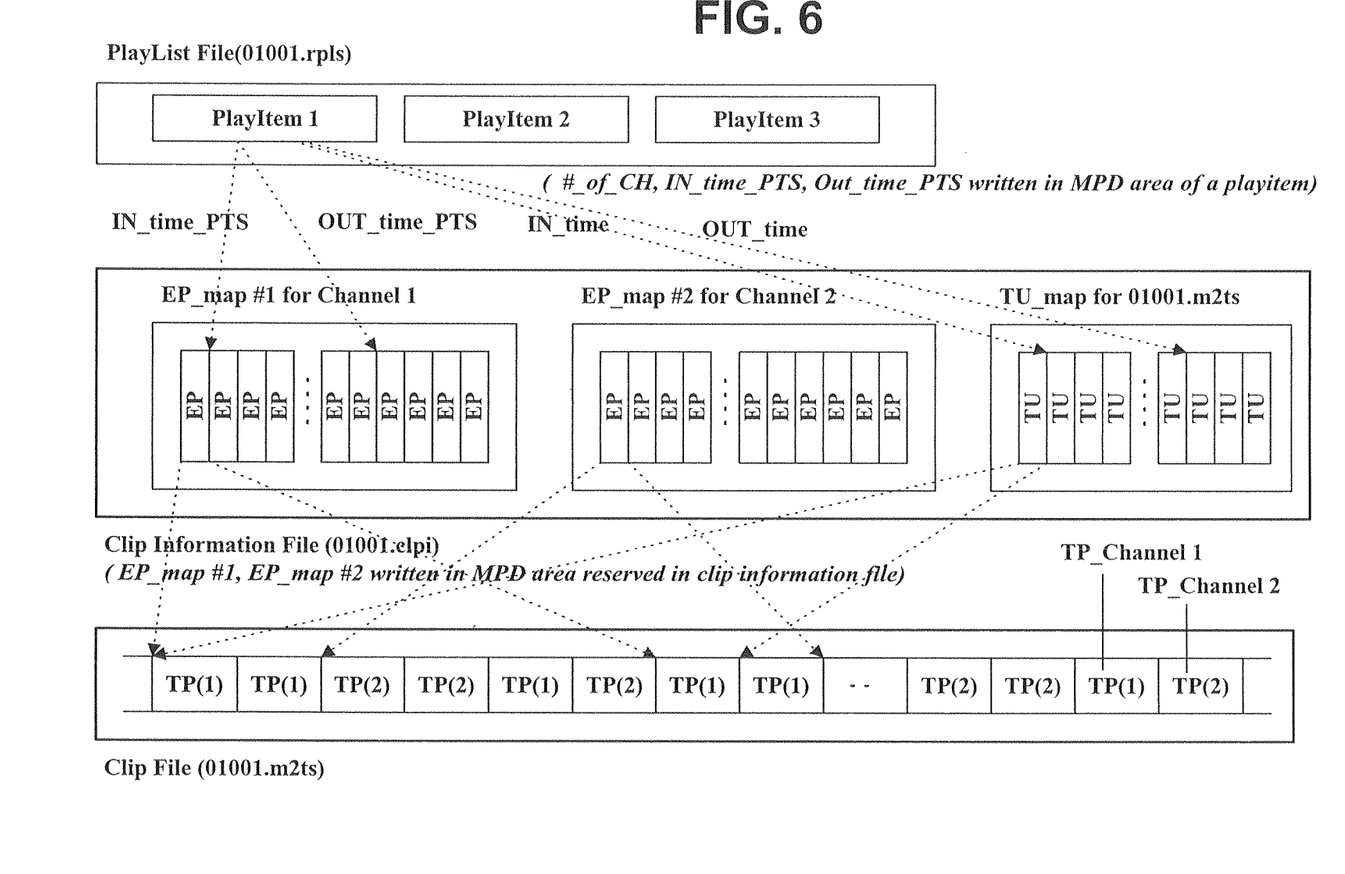
FIG. 6 shows a data stream example in which two subchannel streams extracted from a single physical channel are recorded in the conditional normal recording mode.

FIG. 6 shows a data stream example in which two subchannel streams extracted from a single physical channel are recorded in the CNR mode. In the example of FIG. 6, mutually-multiplexed source packet series 'TP_Channel 1' and 'TP_channel 2' pertaining to two subchannels are recorded in a clip file '01001.m2ts'.

A time unit map for wholly searching a data stream in the file '01001.m2ts' composed of the two subchannel streams has been written in the field 'CPI' of the clip information file '01001.clpi'. And, two EP maps 'EP_map #1' and 'EP_map #2' for searching the first and the second subchannel stream individually have been written in an MPD area reserved in the clip information file '01001.clpi'.

A play list file named '01001.rpls' has been created for playback control of the clip file '01001.m2ts'. The play list file '01001.rpls' has several play items containing management information related with the recorded data stream in the clip file '01001.rpls'. The play item includes the number of subchannels of the recorded multi-channel stream, PTSs 'IN_time_PTS' and 'OUT_time_PTS', written in the EP map, of a start and an end packet of a subchannel stream interval to refer to, and a start and an end time 'IN_time' and 'OUT_time', calculated from the time unit map, of the subchannel stream interval to refer to.

The number of subchannels and the two PTSs 'IN_time_PTS' and 'OUT_time_PTS' are written in an MPD area reserved in a play item.

In the illustrative case of data stream recording in FIG. 6, if a play item, e.g., the first play item is selected from a play list '01001.rpls', the VDR system 3 identifies an entry set in an EP map related with the first subchannel with reference to information of the number of subchannels and the start and the end PTS written in the MPD area of the chosen play item.

Afterwards, the VDR system 3 searches source packets pertaining to the data stream of the first subchannel recorded in multiplexed manner in the file '01001.m2ts' for I-picture starting packets or conducts a trick play of only the first-subchannel stream among the recorded multi-channel stream by selectively decoding I-pictures with reference to the information of PTS_EP_start and SPN_EP_start written in successive entries in the identified entry set.

If another play item related with a data stream of the second subchannel is selected from a play list '01001.rpls', the VDR system 3 identifies an entry set in another EP map related with the second subchannel with reference to information of the number of subchannels and the start and the end PTS written in the MPD area of the chosen play item.

Afterwards, the VDR system 3 searches source packets pertaining to the data stream of the second subchannel recorded in multiplexed manner in the file '01001.m2ts' for I-picture starting packets or conducts a trick play of only the second-subchannel stream among the recorded multi-channel stream by selectively decoding I-pictures with reference to the information of PTS_EP_start and SPN_EP_start written in successive entries in the identified entry set.

In the event that it is needed to search not individually but wholly the recorded multi-channel stream of the two sub-channels recorded in the clip file '01001.m2ts' related with the play list '01001.rpls', the VDR system 3 identifies a clip information file '01001.clpi' including management information about the clip file '01001.m2ts' first, and then accesses fast a certain source packet located most closely to a given time location on the recorded multi-channel broadcast stream.

The above-explained method of recording and managing a multi-channel broadcast stream ensures fast random access and various trick play of individual subchannel streams multiplexed in a recorded multi-channel stream at user's request. Moreover, it makes it possible to search for a certain target point on an entire multi-channel stream fast.

While the invention has been disclosed with respect to a limited number of embodiments, those skilled in the art, having the benefit of this disclosure, will appreciate numerous modifications and variations therefrom. It is intended that the appended claims cover all such modifications and variations as fall within the true spirit and scope of the invention.

What is claimed is:

1. A non-transitory computer readable medium, comprising:
    a data area storing a plurality of transport packets of a multi-channel video stream having different paths; and
    a navigation area;
    a playlist for managing playback of the video stream, the playlist including a playitem indicating a playing interval of the video stream, and the playitem including a field representing the total number of the paths of the video stream; and
    an entry point map defining a relationship between a presentation time stamp and an address of the video stream, the entry point map including an ID of the video stream to which the entry point map is related.

2. The computer readable medium of claim 1, wherein the address corresponds to a source packet number of a corresponding transport packet.

3. The computer readable medium of claim 2, wherein the entry point map is recorded in a reserved area of a clip information file for storing information about the video stream.

4. The computer readable medium of claim 2, wherein the entry point map includes an ID of the transport packets pertaining to a path, a number of entry points, plural pairs of the presentation time stamp and the source packet number.

5. The computer readable medium of claim 4, wherein the playitem indicates a start time and an end time corresponding to the presentation time stamp.

6. A method of recording data on a recording medium, the method comprising:
    recording a plurality of transport packets of a multi-channel video stream in the recording medium, the video stream having different paths;
    recording a playlist for managing playback of the video stream in the recording medium, the playlist including a playitem indicating a playing interval of the video stream, and the playitem including a field representing the total number of the paths of the video stream; and
    recording an entry point map defining a relationship between a presentation time stamp and an address of the video stream, the entry point map including an ID of the video stream to which the entry point map is related.

7. The method of claim 6, wherein the address corresponds to a source packet number of a corresponding transport packet.

8. The method of claim 7, further comprising:
    recording the entry point map in a reserved area of a clip information file for storing information about the video stream.

9. The method of claim 7, further comprising:
    recording an ID of the transport packets pertaining to a path, a number of entry points, plural pairs of the presentation time stamp and the source packet number.

10. The method of claim 9, wherein the playitem indicates a start time and an end time corresponding to the presentation time stamp.

11. An apparatus for recording data on a recording medium, the apparatus comprising:
    a recording unit configured to record data on the recording medium; and
    a controller configured to control the recording unit to:
    record a plurality of transport packets of a multi-channel video stream in the recording medium, the video stream having different paths;
    record a playlist for managing playback of the video stream in the recording medium, the playlist including a playitem indicating a playing interval of the video stream, and the playitem including a field representing the total number of the paths of the video stream; and
    record an entry point map defining a relationship between a presentation time stamp and an address of the video stream, the entry point map including an ID of the video stream to which the entry point map is related.

12. The apparatus of claim 11, wherein the address corresponds to a source packet number of a corresponding transport packet.

13. The apparatus of claim 12, wherein the controller is further configured to control the recording unit to record the entry point map in a reserved area of a clip information file for storing information about the video stream.

14. The apparatus of claim 12, wherein the controller is further configured to control the recording unit to record an ID of the transport packets pertaining to a path, a number of entry points, plural pairs of the presentation time stamp and the source packet number.

15. The apparatus of claim 14, wherein the playitem indicates a start time and an end time corresponding to the presentation time stamp.

16. The apparatus of claim 11, wherein the recording unit includes a pickup.

17. A method of reproducing data from a recording medium, the method comprising:

reading a playlist for managing playback of a multi-channel video stream having different paths, the playlist including a playitem indicating a playing interval of the video stream, and the playitem including a field representing the total number of the paths of the video stream;

reading an entry point map defining a relationship between a presentation time stamp and an address of the video stream, the entry point map including an ID of the video stream to which the entry point map is related; and reading a plurality of transport packets of the video stream from the recording medium based on the playlist and the entry point map.

18. The method of claim 17, wherein the address corresponds to a source packet number of a corresponding transport packet.

19. The method of claim 18, further comprising:

reading the entry point map from a reserved area of a clip information file for storing information about the video stream.

20. The method of claim 18, further comprising:

reading an ID of the transport packets pertaining to a path, a number of entry-points, plural pairs of the presentation time stamp and the source packet number.

21. The method of claim 20, wherein the playitem indicates a start time and an end time corresponding to the presentation time stamp.

22. An apparatus for reproducing video data from a recording medium, the apparatus comprising:

a reproducing unit configured to read data from the recording medium; and a controller configured to control the reproducing unit to:

read a playlist for managing playback of a multi-channel video stream having different paths from the recording medium, the playlist including a playitem indicating a playing interval of the video stream, and the playitem including a field representing the total number of the paths of the video stream;

read an entry point map defining a relationship between a presentation time stamp and an address of the video stream, the entry point map including an ID of the video stream to which the entry point map is related; and read a plurality of transport packets of the video stream from the recording medium based on the playlist and the entry point map.

23. The apparatus of claim 22, wherein the address corresponds to a source packet number of a corresponding transport packet.

24. The apparatus of claim 23, wherein the controller is further configured to control the reproducing unit to read the entry point map from a reserved area of a clip information file for storing information about the video stream.

25. The apparatus of claim 23, wherein the controller is further configured to control the reproducing unit to read an ID of the transport packets pertaining to a path, a number of entry points, plural pairs of the presentation time stamp and the source packet number.

26. The apparatus of claim 25, wherein the playitem indicates a start time and an end time corresponding to the presentation time stamp.

27. The apparatus of claim 22, wherein the reproducing unit includes a pickup.

* * * * *